United States Patent
Liu

(10) Patent No.: US 10,893,434 B2
(45) Date of Patent: Jan. 12, 2021

(54) UE SESSION MANAGEMENT QOS CAPABILITY NEGOTIATION AND QOS CONTROL REALIZATION

(71) Applicant: Nokia Technologies Oy, Espoo (FI)

(72) Inventor: Jennifer Liu, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 57 days.

(21) Appl. No.: 16/157,800

(22) Filed: Oct. 11, 2018

(65) Prior Publication Data

US 2019/0116517 A1  Apr. 18, 2019

Related U.S. Application Data

(60) Provisional application No. 62/572,291, filed on Oct. 13, 2017.

(51) Int. Cl.
*H04W 28/02* (2009.01)
*H04W 76/10* (2018.01)
(Continued)

(52) U.S. Cl.
CPC ......... *H04W 28/0268* (2013.01); *H04L 47/24* (2013.01); *H04L 65/1069* (2013.01);
(Continued)

(58) Field of Classification Search
CPC .......... F03D 7/028; F03D 7/048; F03D 9/255; H02J 3/386; H04L 47/24; H04L 65/1069;
(Continued)

(56) References Cited

U.S. PATENT DOCUMENTS

2014/0169269 A1* 6/2014 Salot ..................... H04W 76/10
370/328
2014/0233380 A1 8/2014 Kim et al.
(Continued)

FOREIGN PATENT DOCUMENTS

WO  2015/039096 A1  3/2015

OTHER PUBLICATIONS

Youn et al., Method for Efficient Handover Between 3GPP and Non-3GPP, Aug. 1, 2018, U.S. Appl. No. 62/489,996, pp. 1-53. (Year: 2018).*

(Continued)

*Primary Examiner* — Omar J Ghowrwal
*Assistant Examiner* — Kokou R Detse
(74) *Attorney, Agent, or Firm* — Alston & Bird LLP

(57) ABSTRACT

In some example embodiments, there may be provided a method that includes forming, by a user equipment, a session establishment message including an indication of at least one session management capability supported by the user equipment; sending, by the user equipment, the session establishment message including the indication towards a session management function; and receiving, by the user equipment and from the session management function, a response indicative of whether the session management function and/or a corresponding network supports the at least one session management capability to enable the user equipment to operate in accordance with the at least one session management capability. Related systems, methods, and articles of manufacture are also described.

34 Claims, 18 Drawing Sheets

(51) Int. Cl.
*H04L 12/851* (2013.01)
*H04L 29/06* (2006.01)
*H04L 29/08* (2006.01)
*H04W 8/24* (2009.01)
*H04W 28/24* (2009.01)

(52) U.S. Cl.
CPC .............. *H04L 67/14* (2013.01); *H04W 8/24* (2013.01); *H04W 28/24* (2013.01); *H04W 76/10* (2018.02)

(58) Field of Classification Search
CPC .. H04L 67/14; H04W 28/0268; H04W 28/24; H04W 76/10; H04W 8/24; Y02E 10/723; Y02E 10/763
USPC ........................................................ 370/329
See application file for complete search history.

(56) References Cited

U.S. PATENT DOCUMENTS

2018/0234876 A1* 8/2018 Jheng ................ H04W 28/0268
2018/0352483 A1* 12/2018 Youn ..................... H04W 76/11

OTHER PUBLICATIONS

Youn etal., Method for Efficient Handover Between 3GPP and Non-3GPP (Not in English), Apr. 25, 2017, U.S. Appl. No. 62/489,996, pp. 1-53. (Year: 2017).*

Youn et al., Method for Efficient Handover Between 3GPP and Non-3GPP, Aug. 1, 2018, U.S. Appl. 62/486,982, pp. 1-52. (Year: 2018).*

Youn et al., Method for Efficient Handover Between 3GPP and Non-3GPP (Not in English), Apr. 19, 2017, U.S. Appl. No. 62/486,982, pp. 1-52. (Year: 2017).*

International Preliminary Report on Patentability for Application No. PCT/EP2018/077699 dated Oct. 9, 2019.

Response Letter, Arguments and Marked-Up Claims for International Application No. PCT/EP2018/077699 from Samson & Partner dated Aug. 13, 2019, 25 pages.

"Pseudo-CR on Qos Rules for a PDU Session", 3GPP TSG-CT Working Group 1 meeting #105, C1-173509, Agenda: 15.2.1.7, Nokia, Aug. 21-25, 2017, 9 pages.

"3rd Generation Partnership Project; Technical Specification Group Services and System Aspects; System Architecture for the 5G System; Stage 2 (Release 15)", 3GPP TS 23.501, V1.4.0, Sep. 2017, pp. 1-151.

International Search Report and Written Opinion received for corresponding Patent Cooperation Treaty Application No. PCT/EP2018/077699, dated Dec. 17, 2018, 13 pages.

Kim et al., "3GPP SA2 Architecture and Functions for 5G Mobile Communication System", ICT Express, vol. 3, No. 1, Mar. 2017, pp. 1-8.

U.S. Appl. No. 62/457,199, filed Feb. 10, 2017; In re: Jheng et al., entitled *5G QoS Signaling*.

* cited by examiner

|   | 8 | 7 | 6 | 5 | 4 | 3 | 2 | 1 |   |
|---|---|---|---|---|---|---|---|---|---|
| UE SM capability IEI | | | | | | | | | octet 1 |
| Length of UE SM capability contents | | | | | | | | | octet 2 |
| 0 Spare | 0 Spare | 0 Spare | 0 Spare | 0 Spare | 0 Spare | Cap#2 Ind | Cap#1 Ind | | octet 3 |
| 0 | 0 | 0 | 0 | 0 | 0 | 0 | 0 | | octet 4*-5* |
| Spare | | | | | | | | | |

FIG. 1D

| 8 | 7 | 6 | 5 | 4 | 3 | 2 | 1 | octet 1 |
|---|---|---|---|---|---|---|---|---|
| Network SM capability support IEI | | | | 0 Spare | 0 Spare | Cap#2 Ind | Cap#1 Ind | |

FIG. 1E

|   | 8 | 7 | 6 | 5 | 4 | 3 | 2 | 1 | |
|---|---|---|---|---|---|---|---|---|---|
| Network SM capability support IEI | | | | | | | | | octet 1 |
| Length of Network SM capability support contents | | | | | | | | | octet 2 |
| 0 Spare | 0 Spare | 0 Spare | 0 Spare | 0 Spare | 0 Spare | Cap#2 Ind | Cap#1 Ind | | octet 3 |
| 0 | 0 | 0 | 0 | 0 | 0 | 0 | 0 | | |
| Spare | | | | | | | | | octet 4* - 5* |

FIG. 1F

|   | 8 | 7 | 6 | 5 | 4 | 3 | 2 | 1 |
|---|---|---|---|---|---|---|---|---|
| octet 1 | UE SM capability IEI | | | | | | | |
| octet 2 | Length of UE SM capability contents | | | | | | | |
| octet 3 | 0 Spare | 0 Spare | 0 Spare | 0 Spare | 0 Spare | 0 Spare | 0 Spare | RQoS |
| octet 4*–5* | 0 | 0 | 0 | 0 Spare | 0 | 0 | 0 | 0 |

| 8 | 7 | 6 | 5 | 4 | 3 | 2 | 1 | |
|---|---|---|---|---|---|---|---|---|
| 0 | 0 | 0 | 0 | Packet filter identifier 1 | | | | Octet 10 |
| | Spare | | | | | | | |
| 0 | 0 | 0 | 0 | Packet filter identifier 2 | | | | Octet 11 |
| | Spare | | | | | | | |
| ... | | | | | | | | |
| 0 | 0 | 0 | 0 | Packet filter identifier N | | | | Octet N+3 |
| | Spare | | | | | | | |

Packet filter list when the rule operation is "delete packet filters from existing QoS rule" (z=N+3)

| 8 | 7 | 6 | 5 | 4 | 3 | 2 | 1 | |
|---|---|---|---|---|---|---|---|---|
| 0 | 0 | 0 | 0 | Packet filter identifier 1 389A | | | | Octet 10 |
| Packet filter evaluation precedence 1     390A | | | | | | | | Octet 11 |
| Length of Packet filter contents 1     392A | | | | | | | | Octet 12 |
| Packet filter contents 1     394A | | | | | | | | Octet 13 / Octet m |
| 0 | 0 | 0 | 0 | Packet filter contents 2 389B | | | | Octet m+1 |
| Packet filter evaluation precedence 2     390B | | | | | | | | Octet m+2 |
| Length of Packet filter contents 2     392B | | | | | | | | Octet m+3 |
| Packet filter contents 2     394B | | | | | | | | Octet m+4 / Octet n |
| ... | | | | | | | | Octet n+1 / Octet y |
| 0 | 0 | 0 | 0 | Packet filter identifier N 389C | | | | Octet y+1 |
| Packet filter evaluation precedence N     390C | | | | | | | | Octet y+2 |
| Length of Packet filter contents N     392C | | | | | | | | Octet y+3 |
| Packet filter contents N     394C | | | | | | | | Octet y+4 / Octet z |

Packet filter list when the rule operation is "create new QoS rule", or "add packet filters to existing QoS rule" or "replace packet filters in existing QoS rule"

FIG. 3E

| 8 | 7 | 6 | 5 | 4 | 3 | 2 | 1 | |
|---|---|---|---|---|---|---|---|---|
| Parameter identifier 1 ||||||||  Octet z+1 |
| Length of Parameter contents 1 |||||||| Octet z+2 |
| Parameter contents 1 |||||||| Octet z+3 Octet k |
| Parameter identifier 2 |||||||| Octet k+1 |
| Length of Parameter contents 2 |||||||| Octet k+2 |
| Parameter contents 2 |||||||| Octet k+3 Octet p |
| ... |||||||| Octet p+1 Octet q |
| Parameter identifier N |||||||| Octet q+1 |
| Length of Parameter contents N |||||||| Octet q+2 |
| Parameter contents N |||||||| Octet q+3 Octet v |

Parameter List

FIG. 3F

Figure 5. Derived QoS Rules removed from the UE

UE SESSION MANAGEMENT QOS CAPABILITY NEGOTIATION AND QOS CONTROL REALIZATION

FIELD

The subject matter described herein relates to cellular networks.

BACKGROUND

As the cellular system including the 5G network supports an increasing number of devices and services including applications with a wide range of use cases and diverse needs with respect to bandwidth, latency, and reliability requirements, the cellular system may need to prioritize resources across the wireless access network and the core network (and/or for example, prioritizing across the control plane and the user plane) to support differentiation among different service data flows (SDFs). Moreover, the associated quality of service (QoS) requirements may be dynamic. As such, flexible and efficient QoS control mechanisms may enable establishment, modification, and/or enforcement of the QoS requirements, examples of which include maximum bit rate, guaranteed bit rate, priority level, packet delay budget, packet loss rate, and/or other QoS parameters.

SUMMARY

Methods and apparatus, including computer program products, are provided for session management. In some example embodiments, there may be provided a method including forming, by a user equipment, a session establishment message including an indication of at least one session management capability supported by the user equipment; sending, by the user equipment, the session establishment message including the indication towards a session management function; and receiving, by the user equipment and from the session management function, a response indicative of whether the session management function and/or a corresponding network supports the at least one session management capability to enable the user equipment to operate in accordance with the at least one session management capability.

In some variations, one or more of the features disclosed herein including the following features can optionally be included in any feasible combination. The session establishment message may include a packet data unit session establishment request, wherein the session establishment message includes the indication, a packet data unit session identifier, and a packet data unit type. The indication may include an information element comprising at least one bit, wherein a value of the at least one bit indicates whether the at least one session management capability is supported by the user equipment. The at least one session management capability supported by the user equipment may include support for reflective quality of service, and wherein the value of the at least one bit indicates whether the reflective quality of service is supported by the user equipment. The response may include a timer value for a timer associated with the reflective quality of service, wherein the timer value is indicative of whether the session management function supports the at least one session management capability comprising the reflective quality of service. The user equipment may receive at least one downlink packet marked to indicate that the at least one packet is subject to the reflective quality of service, and derive, based on the at least one downlink packet, at least one quality of service rule for use on at least one uplink packet. The user equipment may receive at least one downlink packet not marked to indicate that the at least one packet is subject to the reflective quality of service, and remove at least one quality of service rule, when the timer expires. The response may include a packet data unit session establishment accept. The response may include session management information and/or at least one quality of service rule authorized for the user equipment. The session management information and/or the at least one quality of service rule may be carried by at least one information element.

In some example embodiments, there may be provided a method including receiving, at a session management function node and from a user equipment, the session establishment message including an indication of at least one session management capability supported by the user equipment; and sending, by the session management function node and to the user equipment, a response indicative of whether the session management function and/or a corresponding network supports the at least one session management capability to enable the user equipment to operate in accordance with the at least one session management capability.

In some variations, one or more of the features disclosed herein including the following features can optionally be included in any feasible combination. The session establishment message may include a packet data unit session establishment request, wherein the session establishment message includes the indication, a packet data unit session identifier, and a packet data unit type. The indication may include an information element comprising at least one bit, wherein a value of the at least one bit indicates whether the at least one session management capability is supported by the user equipment. The at least one session management capability supported by the user equipment may include support for reflective quality of service, and wherein the value of the at least one bit indicates whether the reflective quality of service is supported by the user equipment. The response may include a packet data unit session establishment accept. The response may include session management information, at least one quality of service rule authorized for the apparatus, and/or at least one capability parameter.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIGS. 1C-1D depict examples of UE session management capability information elements, in accordance with some example embodiments;

FIGS. 1E-1F depict examples of network session management capability information elements, in accordance with some example embodiments;

FIGS. 2B-2C depict examples of a UE session management capability information element, in accordance with some example embodiments;

FIGS. 3B-3E depict examples of information elements associated with QoS rules, in accordance with some example embodiments;

FIG. 3F depicts an example of a parameters list, in accordance with some example embodiments;

Figure 1A:
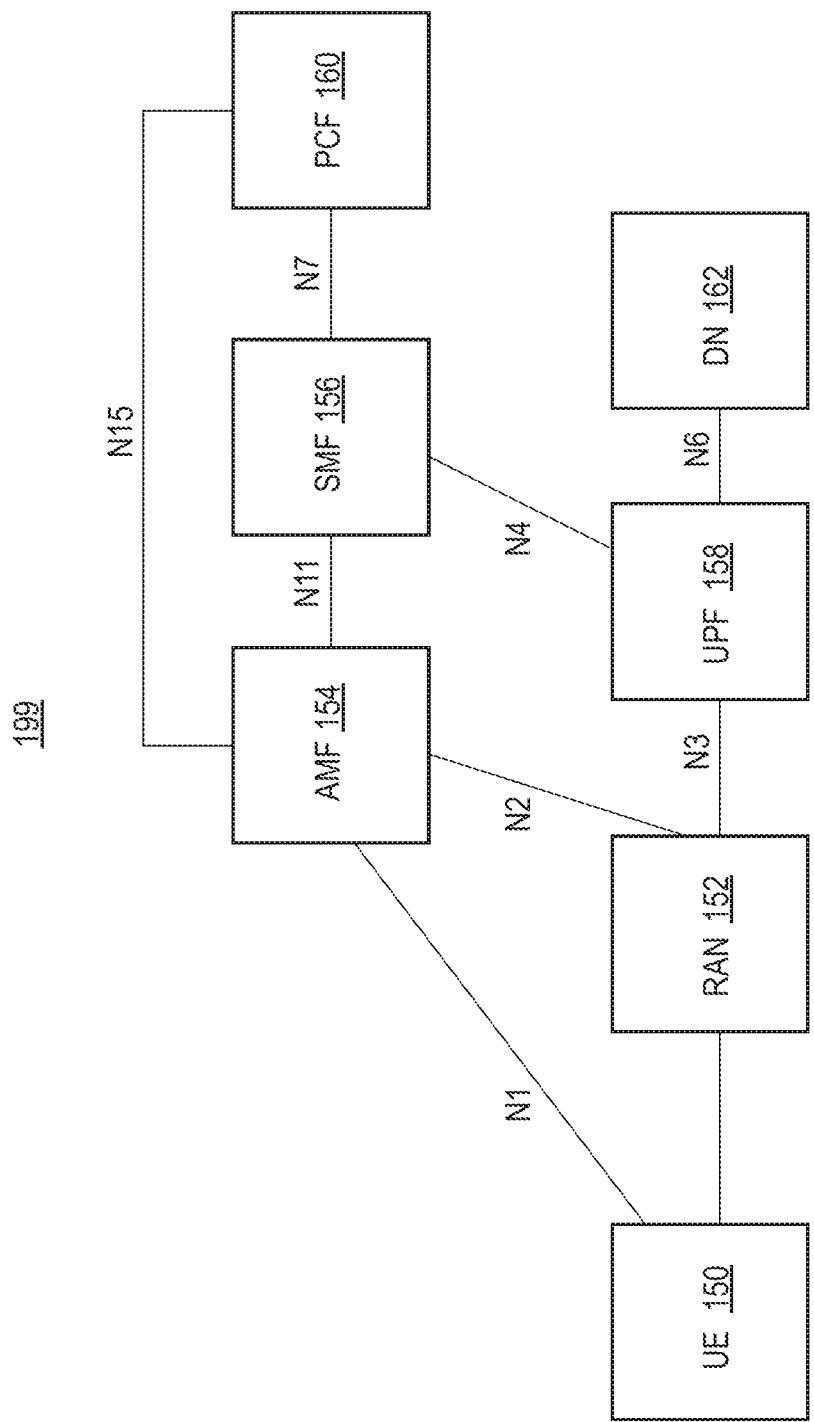
FIG. 1A depicts an example of a portion of a 5G wireless network 199, in accordance with some example embodiments.

Like labels are used to refer to same or similar items in the drawings.

DETAILED DESCRIPTION

Reflective QoS support is a QoS control mechanism allowing a user equipment (UE) to derive, based on the received the downlink (DL) traffic from the core network, a QoS rule, when the UE reflective QoS function is enabled by the network. However, there is a need in 5G to provide support for reflective QoS including related signaling and encoding of QoS related information.

In some example embodiments, there may be provided a UE session management (SM) capability negotiation. In some example embodiments, there may be provided encoding and/or signaling of QoS classification and marking rules to the UE. Moreover, there may be provided a mechanism for signaling the UE session management capabilities to the network. Alternatively or additionally, there may be provided an enhancement to the packet data unit (PDU) session establishment request message to support UE session management capability signaling. Alternatively or additionally, there may be provided signaling for supporting reflective QoS capability negotiation.

Mobility management (MM) and session management (SM) may be considered two functions handled by the non-access stratum (NAS) between the user equipment and the core network. In the 4G system, the mobility management function and the session management function may be managed by the same core network node, such as the mobility management entity (MME) which in the case of LTE handles mobility management and session management. To support home routed roaming, gateway core network (GWCN) sharing, and/or other 5G features, the 5G system's mobility management function and session management may be separated into two standalone functions (for example, at two different nodes). For 5G mobility management, an access and mobility management function (AMF) node may provide UE access and mobility management functions including UE registration/de-registration, UE location reachability, and/or the like as defined, for example, in 3GPP TS 23.501. In 5G, session management may be provided by a session management function (SMF) for the end-to-end control functions on packet data unit (PDU) sessions as defined, for example, in 3GPP TS 23.501. Moreover, the session management messages may be transferred via the AMF and terminated at the SMF. Accordingly, there may be a need for the UE to send its session management capability separately to the SMF for session management capability negotiation.

FIG. 1A depicts an example of a portion of a 5G wireless network 199, in accordance with some example embodiments. The 5G wireless network 199 may include a user equipment (UE) 150 configured to wirelessly couple to a radio access network (RAN) 152, such as a base station and/or other type of wireless access point. The network 199 may include a core network, which may include an AMF 154, an SMF 156, a policy control function (PCF) 160, and a user plane function (UPF) 158. The network 199 may also couple to other nodes and networks, such as a data network (DN) 162. FIG. 1A also depicts service interfaces, such as N1, N2, N3, N4, N6, N7, N11, N15, and/or the like. The architecture and the service interfaces may be defined in accordance with a standard, such as 3GPP TS 23.501.

Figure 1B:
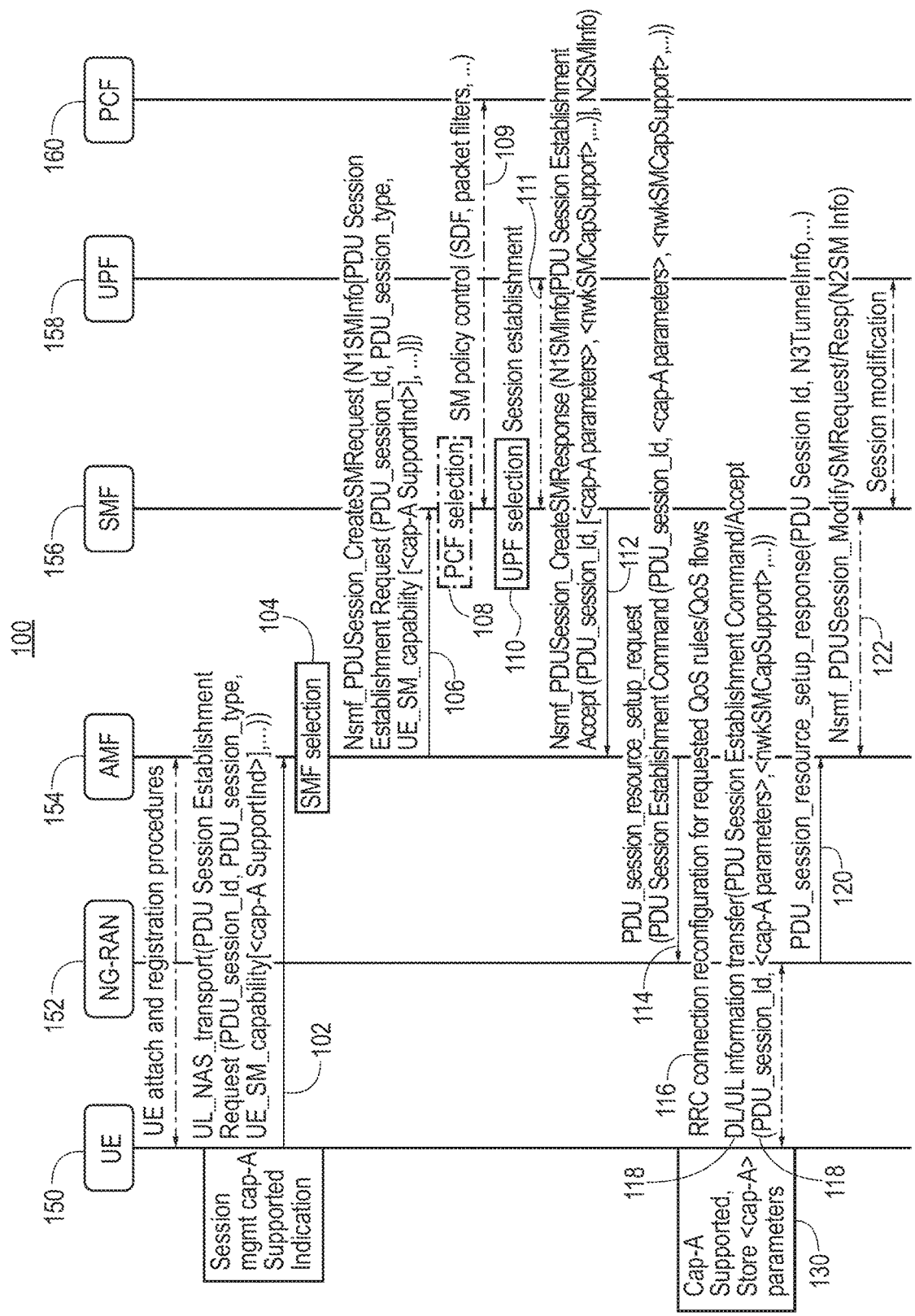
FIG. 1B depicts an example of a signaling flow for a user equipment (UE) signaling to the network with UE session management capabilities, in accordance with some example embodiments.

FIG. 1B depicts an example of a signaling flow 100 for the UE 150 to signal to the network the UE's session management capabilities, in accordance with some example embodiments. In some example embodiments, the UE may negotiate with the network the session management capabilities to be used by the UE by sending a message including an indication of at least one session management capability (for example, a service or capability to be provided as part of the network's session management of a packet data unit session) requested from the network. The network may respond, as part of the negotiation, with an acceptance of the requested at least one session management capability if the network can support (or agrees to provide) the requested at least one session management capability. The session management capabilities of the UE refer to, for example, those capabilities supported by the UE with respect to session management, examples of which include reflective QoS (RQoS), ultra-reliable low latency communications (URLLC), and/or the like.

During, for example, the packet data unit (PDU) session establishment, the UE 150 may send, at 102, a message, such as a NAS message, to the AMF 154, in accordance with some example embodiments. The message sent at 102 may include a PDU session establishment request as part of the N1 session management information. In accordance with some example embodiments, the UE may indicate support of a UE SM capability, such as RQoS or other UE SM capability (for example, "cap-A"). This UE SM capability may be signaled to the network using an information element (IE) in a message 102. An example of this information element is the "UE_SM_capabilty" which in this example carries a UE SM capability supported indication (for example, "RQoS-supportedInd" or "cap-A SupportedInd") at message 102. The access network 152 may encapsulate the NAS message sent, at 102, in a N2 message sent towards the AMF 154.

The AMF 154 may determine that the message 102 corresponds to a request for a new PDU session. When this is the case, the AMF may select, at 104, an SMF 156 (for example, from a plurality of SMFs). At 106, the AMF may then forward, to the selected SMF 156, the PDU session establishment request including the UE_SM_capabilty information element including a UE SM capability indication (for example "RQoS-supportedInd" or "cap-A SupportedInd").

The SMF 156 may perform, at 108, PCF 160 selection and obtain, at 109, dynamic policy and charging control (PCC) or obtain default PCC rules for the PDU session based on location policy. At 111, the SMF may initiate an N4 session establishment with the UPF 158 (which may be selected at 110).

In accordance with some example embodiments, the SMF 156 may send, at 112, to the AMF 154 a PDU session establishment accept message, which may include the N2 SM information. If the UE SM capability (which was requested by the UE at 102) is supported by the network, the SMF may also include the UE SM capability indication and/or related UE SM parameters. In the example of FIG. 1B, the SM parameters are indicated by "cap-A parameters" for the request SM capability A; the (cap-A) specific service parameters for realizing the cap-A service (which were requested by the UE as part of the PDU session establishment request). For example, the SMF may include an "RQoS-supportedInd" or an RQoS parameter, such as an RQoS timer value toward the UE. At 114, the AMF 154 may send to the radio access network 152 (labeled NG-RAN) a PDU session resource setup request including the N2 UE SM capability indications (for example, "RQoS-supportedInd", or "cap-A SupportedInd"), N2 UE SM capability parameters (for example, RQoS timer value or "cap-A parameter"), and PDU session establishment accept message.

At 116, the radio access network 152 may initiate an access-specific signaling exchange (for example, via radio resource control) with the UE 150 to allocate radio access network resources for the QoS flows indicated in the authorized QoS rules and the RAN N3 tunnel information for the PDU session.

At 118, if the resource allocation is successful, the radio access network 152 may forward, in accordance with some example embodiments, the PDU session establishment accept message to the UE. The UE may determine whether the SM capability is supported or not by the explicit presence of SM capability support indication or SM capability related parameters (for example, "cap-A parameters) carried by the message at 118.

To illustrate by way of an example, the UE 150 may receive at 118 a capability parameter corresponding to a reflective QoS (RQoS) timer value, which may be received in response to the UE 150 sending, at 102, the cap-A SupportedInd corresponding to the RQoS supported at the UE.

At 120, the radio access network 152 may send to the AMF 154 the PDU session resource setup response message with the N2 SM information. At 122, the AMF may forward N2 SM information from access network to the SMF 156 in an Nsmf_PDUSession_UpdateSMContext request message. The PDU session may be established.

The UE session management capability information element (as shown for example at 102 and 106 at FIG. 1A) may signal the UE's capabilities related to PDU session management. In some example embodiments, this information element may code (as a type 1 information element) the UE's SM capability. When this is the case, the UE session management capability information may provide up to 4 UE session management capability indications.

Figure 1C:
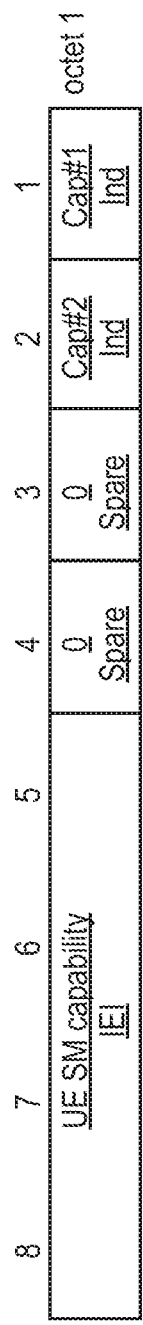

FIG. 1C depicts an example of the UE SM capability information element carried in the first 4 bits of an octet, in accordance with some example embodiments. As shown at FIG. 1C, when the first bit (labeled Cap #1Ind) is a 0, this may signal that the $1^{st}$ SM capability is not supported by the UE, but a value of 1 may indicate that the $1^{st}$ SM capability is supported by the UE. Likewise, when the second bit (labeled Cap #2Ind) is a 0, this may signal that the $2^{nd}$ SM capability is not supported by the UE, but a value of 1 may indicate that the $2^{nd}$ SM capability is supported by the UE. In the example of FIG. 1C, the bits 3 and 4 are used as spares but may be used to signal UE support for additional SM capabilities as well. Table 1 below summarizes the UE SM capability information element of FIG. 1C. Bits 5-8 may be used to carry the UE SM capability IEI, which is used to identify the information element in the message.

TABLE 1

UE SM capability value (octet 1, bit 1 to 4)
Capability#1 Indicator (octet 1, bit 1)
This bit indicates the UE capability to support <capability#1>.
0                 <Capability#1> not supported
1                 <Capability#1> supported
Capability#2 Indicator (octet 1, bit 2)
This bit indicates the UE capability to support <capability#2>.
0                 <Capability#2> not supported
1                 <Capability#2> supported
Bits 3 and 4 of octet 1 are spare and may be coded as zero.

In some example embodiments, the UE session management capability information element may signal the UE's capabilities related to PDU session management as a type 4 information element. When this is the case, the UE session management capability information may provide up to 16 UE session management capability indications. For example, the UE SM capability in the type 4 implementation may have a minimum length of 3 octets and a maximum length of 5 octets.

FIG. 1D depicts an example of the type 4 UE session management capability information element, in accordance with some example embodiments. In the example of FIG. 1D, octets 1-3 may carry the UE's SM capabilities (which are related to PDU session management). In the example of FIG. 1D, the $1^{st}$ octet includes the UE SM capability IEI and the $2^{nd}$ octet includes an indication of the length of the contents, such as whether the message will be 3, 4, or 5 octets in length. The $3^{rd}$-$5^{th}$ octets may be used to carry the SM capability indicators. In the example of FIG. 1D, only the $3^{rd}$ octet is used, although other quantities of octets may be used as well. As shown at FIG. 1D and summarized in Table 2 below, when the $1^{st}$ bit (labeled Cap #1Ind) is a 0, this may signal that the $1^{st}$ SM capability is not supported by the UE, but a value of 1 may indicate that the $1^{st}$ SM capability is supported by the UE. When the $2^{nd}$ bit (labeled Cap #2Ind) is a 0, this may signal that the $2^{nd}$ SM capability is not supported by the UE, but a value of 1 may indicate that the $2^{nd}$ SM capability is supported by the UE.

TABLE 2

UE SM capability value
Capability#1 Indicator (octet 3, bit 1)
This bit indicates the UE capability to support <capability#1>.
0                 <Capability#1> not supported
1                 <Capability#1> supported
Capability#2 Indicator (octet 3, bit 2)
This bit indicates the UE capability to support <capability#2>.
0                 <Capability#2> not supported
1                 <Capability#2> supported
All other bits in octet 3 to 5 are spare and may be coded as zero, if the respective octet is included in the information element.

The PDU session establishment request message sent, at 102, by the UE to the network may initiate establishment of a PDU session. The UE SM capability information element (e.g., UE_SM_capability) may be included in the message 102, when the UE requests establishment of a new PDU session of type "IPv4", "IPv6" or "Ethernet" and the UE supports Reflective QoS. Table 3 below depicts an example of a PDU session establishment request message including a PDU session identifier (ID), a PDU session type, and the UE_SM_capability information element. The UE_SM_capability information element may have the same coding scheme as noted above with respect to Tables 1 and 2 above.

TABLE 3

PDU session establishment request message

| IEI | Information Element | Type/Reference | Presence | Format | Length |
|---|---|---|---|---|---|
|  | PDU session ID | PDU session ID | M | V | ½ |
|  | ... | | | | |
| a- | PDU session type | PDU session type | O | TV | 1 |
| Xx | UE SM capability | UE SM capability | O | TV | 1 or 3-5 |

In some example embodiments, there may be provided a network session management capability information element to enable signaling of a network response to the UE requested SM capabilities. The network session management capability information element may be coded, as a type 1 information element, to provide up to 4 session management capability indications. FIG. 1E depicts an example of an octet for the network session management capability information element, and Table X below summarizes its operation.

TABLE X

Network SM capability support information element

Network SM capability support value (octet 1, bit 1 to 4)
Capability#1 Indicator (octet 1, bit 1)
This bit indicates the network support of SM <capability #1>
0     <Capability#1> not supported
1     <Capability#1> supported
Capability#2 Indicator (octet 1, bit 2)
This bit indicates the network support of SM <capability#2>.
0     <Capability#2> not supported
1     <Capability#2> supported
Bits 3 and 4 of octet 1 are spare and shall be coded as zero.

Alternatively or additionally, the network session management capability information element may be coded, as a type 4 information element, to provide up to 16 session management capability indications. FIG. 1F depicts an example implementation for the network session management capability information element, and Table X2 below summarizes its operation. In the example of FIG. 1F, the network SM capability support IE may have a minimum length of 3 octets and a maximum length of 5 octets.

TABLE 1X

Network SM capability support information element

Network SM capability support value
Capability#1 Indicator (octet 1, bit 1)
This bit indicates the network support of SM <capability #1>
0     <Capability#1> not supported
1     <Capability#1> supported
Capability#2 Indicator (octet 1, bit 2)
This bit indicates the network support of SM <capability #2>
0     <Capability#2> not supported
1     <Capability#2> supported
All other bits in octet 3 to 5 are spare and shall be coded as zero, if the respective octet is included in the information element.

In some example, embodiments, the PDU session establishment accept message (see, e.g., 118) may indicate a successful establishment of a PDU session. The PDU session establishment accept message may include a network SM capability support information element to inform the UE of the set of session management capabilities that the network supports, which may include the SM capabilities requested by the UE via UE SM capability IE in the PDU SESSION ESTABLISHMENT REQUEST message.

If the network sends capabilities parameters (or additional capabilities parameters) to the UE, then the network may not explicit signal support of the UE requested SM capabilities as capability parameters sent by the network can be used as an implicit indication that the network supports and enables the requested SM capability. Moreover, some session management services may not require special UE capabilities or may not require an explicit UE request for the service to be enabled. Table 1G below depicts the contents of the PDU session establishment accept message including a network SM capability support information element, in accordance with some example embodiments. Table 1H depicts another implementation of the contents of the PDU session establishment accept message including a network SM capability support information element, in accordance with some example embodiments.

TABLE 1G

PDU session establishment accept message

| IEI | Information Element | Type/Reference | Presence | Format | Length |
|---|---|---|---|---|---|
|  | PDU session ID | PDU session ID | M | V | ½ |
| a- | PDU session type | PDU session type | O | TV | 1 |
| xx | Network SM capability support | Network SM capability support | O | TV | 1 |
| xx | <capability#1 parameter> | <capability#1 parameter> | O | . | . |

TABLE 1H

PDU session establishment accept message

| IEI | Information Element | Type/Reference | Presence | Format | Length |
|---|---|---|---|---|---|
|  | PDU session ID | PDU session ID | M | V | ½ |
| a- | PDU session type | PDU session type | O | TV | 1 |
| Xx | Network SM capability support | Network SM capability support | O | TLV | 3-5 |
| Xx | <capability#1 parameter> | <capability#1 parameter> | O | ... | ... |

In some example embodiments, the UE may be configured to operate using reflective QoS. This reflective mode QoS may be applicable when a PDU session is of a PDU session type of "IP", "IPv4", "IPv6" and "Ethernet," for example. The reflective QoS may not be applicable when the PDU session is of a PDU session type of "unstructured," for example.

Figure 2A:
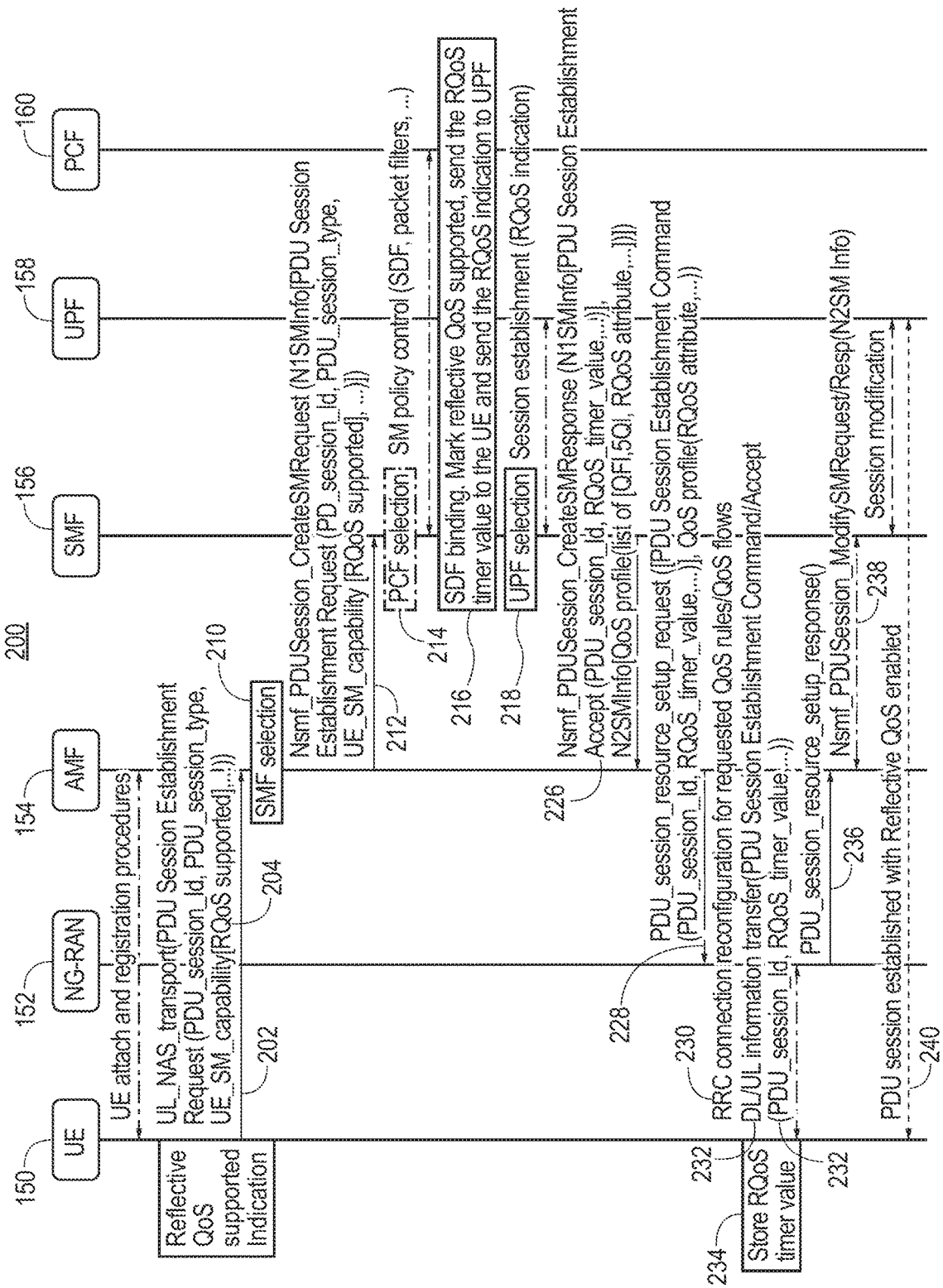
FIG. 2A depicts an example of a signaling flow for the UE session management negotiation for reflective QoS support, in accordance with some example embodiments.

FIG. 2A depicts an example of a signaling flow 200 for the UE session management negotiation for reflective QoS support, in accordance with some example embodiments.

During the PDU session establishment, the UE 150 may send, at 202, a NAS message including a PDU session establishment request within the N1 SM information, such as the UE_SM_capability. If the UE supports the reflective QoS, the UE may indicate in the UE_SM_capability information element support of the reflective QoS capability as shown by the indicator 204 (labeled "RQoS supported").

The NAS message sent at 202 may be encapsulated, by the access network 152, in an N2 message towards the AMF 154.

When the AMF 154 determines the message corresponds to a request for a new PDU Session, the AMF may select, at 210, an SMF 156. The AMF may forward, at 212, to the SMF 156 the PDU session establishment request including the UE_SM_capability having the RQoS supported, in accordance with some example embodiments.

At 214, the SMF 156 may perform PCF selection and obtain, at 215, dynamic PCC or may obtain default PCC rules for the PDU session based on location policy.

At 216, the SMF 156 may perform service data flow (SDF) binding and may mark reflective QoS supported, in accordance with some example embodiments. The SMF may also send to the UE the reflective QoS (RQoS) timer value, in accordance with some example embodiments. Furthermore, the SMF may send, at 220, to the UPF 158 (which may be selected at 218) the RQoS supported indication, when initiating N4 session establishment.

At 226, the SMF 156 may send to AMF 154 a PDU session establishment accept message including the RQoS timer value and N2 SM information having a QoS profile including RQoS attributes as well as other QoS attributes. At 228, the AMF 154 may send to access network 152 a PDU session resource setup request including the RQoS timer value and N2 SM information having a QoS profile including RQoS attributes as well as other QoS attributes.

At 230, the access network 153 may initiate access specific signaling exchange with the UE 150 to allocate the necessary radio access network resources for QoS flows indicated in the authorized QoS rules and RAN N3 tunnel information for the PDU session. If resource allocation is successful, the access network 153 may, at 232, forward to the UE 150 the PDU session establishment accept message including the RQoS timer values and/or the like. The UE 150 may then determine that RQoS is enabled at the UE, and may store, at 234, the RQoS timer value.

At 236, the access network 153 may send to AMF 154 a PDU session resource setup response message including N2 SM information. The AMF may forward, at 238, the N2 SM information to the SMF via a message, such as an Nsmf_P-DUSession_UpdateSMContext request message. The PDU session may be established, at 240, with reflective QoS enabled.

Figure 2B:
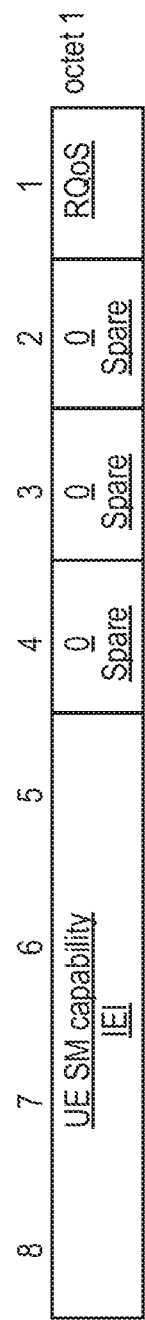

In some example embodiments, the UE SM capability information element (UE_SM_capability) may carry an indicator, such as indicator 204, which may be implemented using at least a bit, to signal whether the UE supports reflective QoS during the UE PDU session establishment. FIG. 2B depicts an example implementation of the UE_SM_capability information element including, at bit 1, the RQoS supported indicator 204. For example, if the RQoS has a value of "1" it may indicate that reflective QoS is supported or enable, while a value of "0" may indicate that reflective QoS is not supported or enabled at the UE. Table 5 below lists a summary of the UE SM capability information element of FIG. 2B.

TABLE 5

UE SM capability value (octet 1, bit 1 to 4)
RQoS(octet 1, bit 1)
This bit indicates the UE capability to support reflective QoS.
0                            Reflective QoS not supported
1                            Reflective QoS supported
Bits 2, 3 and 4 of octet 1 are spare and may be coded as zero.

FIG. 2C depicts another example implementation of the UE_SM_capability information element including. Table Z below lists a summary of the UE SM capability information element of FIG. 2B. Table Z1 depicts an example of a PDU session establishment accept message including at least one capabilities parameter, such as the RQoS timer value provided by the network to the UE.

TABLE Z

UE SM capability information element

UE SM capability value
RQoS(octet 1, bit 1)
This bit indicates the UE capability to support reflective QoS.
0                            Reflective QoS not supported
1                            Reflective QoS supported
All other bits in octet 3 to 5 are spare and shall be coded as zero, if the respective octet is included in the information element.

TABLE Z1

PDU session establishment accept message

| IEI | Information Element | Type/Reference | Presence | Format | Length |
|---|---|---|---|---|---|
| | PDU session ID | PDU session ID | M | V | ½ |
| | ... | | | | |
| a-xx | PDU session type | PDU session type | O | TV | 1 |
| | RQoS timer value | RQoS timer value | O | ... | ... |

Figure 3A:
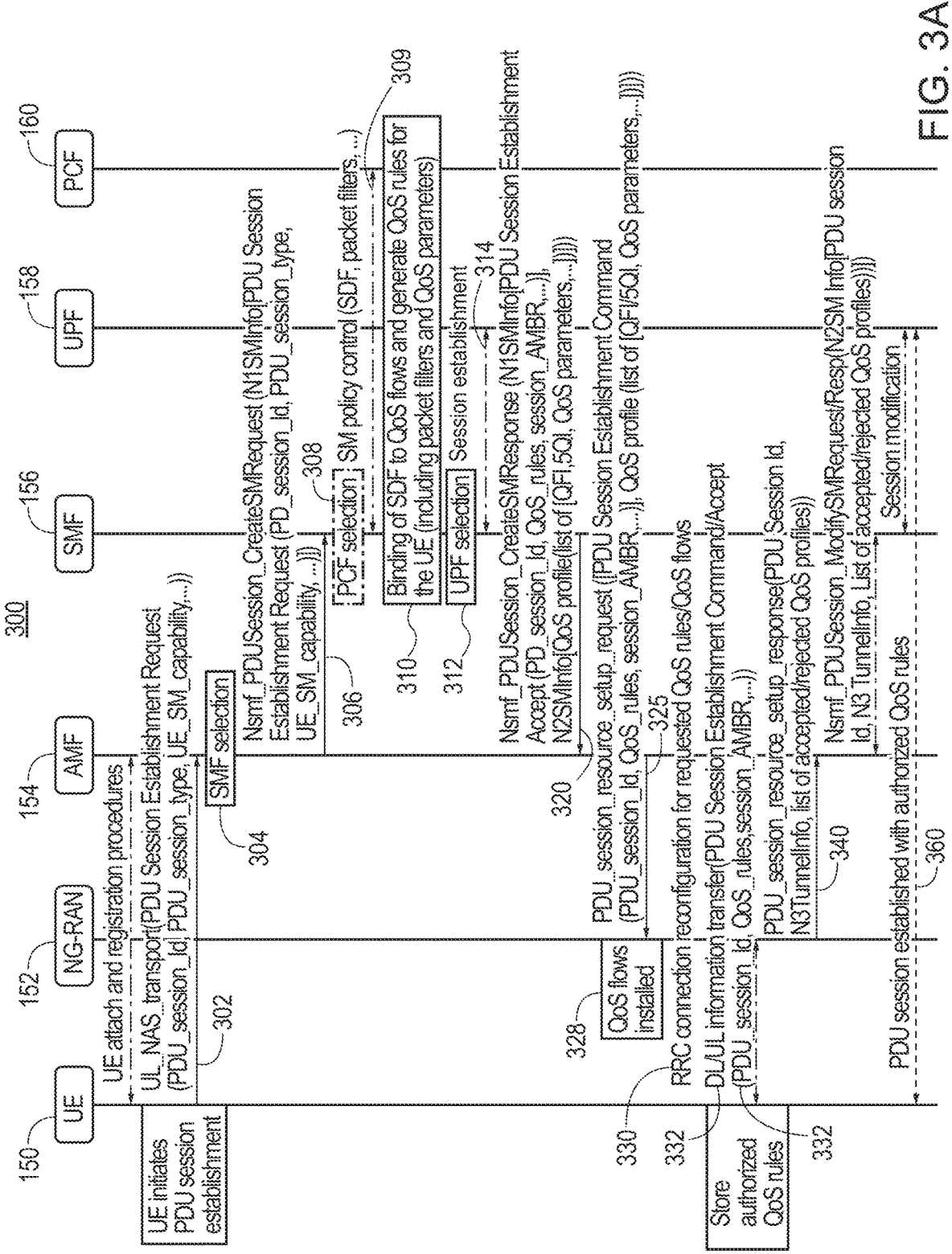
FIG. 3A depicts authorized QoS rules signaling, in accordance with some example embodiments.

FIG. 3A depicts authorized QoS rules signaling 300 for enabling the UE 250 to obtain authorized QoS rules from the network, in accordance with some example embodiments.

During the PDU session establishment, the UE 150 may send, at 302, a NAS message including a PDU session establishment request as part of the N1 SM information. The PDU session establishment request may include the UE's SM capability information element (UE_SM_capability), in accordance with some example embodiments. The NAS message sent by the UE may be encapsulated by the access network 152 in a N2 message towards the AMF.

When the AMF 154 determines that the message received at 302 corresponds to a request for a new PDU session, the AMF may select, at 304, an SMF 156. The AMF 154 may forward, at 306, the PDU session establishment request to the SMF 156.

At 308, the SMF may perform PCF selection and may obtain, at 309, dynamic PCC or the default PCC rules for the PDU session by location policy. At 310, the SMF 156 may perform binding of the SDF to QoS flows, and the SMF 156 may generate QoS rules for the UE (including packet filters and QoS parameters). The SMF 156 may then initiate, at 314, N4 Session establishment with the UPF 158 selected at 312.

In some example embodiments, the SMF 156 may send, a 320, to the AMF 154 a PDU session establishment accept message including authorized QoS rules, session-aggregate maximum bit rate (AMBR) information, and N2 SM information, which may further include a QoS profile (e.g., a QoS parameters and the like). At 325, the AMF 154 may send to the access network 152 a PDU session resource setup request message including authorized QoS rules, session-aggregate maximum bit rate (AMBR) information, and N2 SM information (which may include QoS profiles, QoS parameters, and/or the like).

At 330, the access network 152 may initiate an access specific signaling exchange with the UE 150 to allocate the necessary RAN resources for QoS flows 328 indicated in the authorized QoS rules and RAN N3 tunnel information for the PDU session. At 332, if resource allocation is successful, the access network 152 may forward to the UE 150 the PDU session establishment accept message including the authorized QoS rules, AMBR information, and/or other SM information, in accordance with some example embodiments.

At 340, the access network 152 may send to the AMF 154 a PDU session resource setup response message including the N2 SM information on RAN tunnel information and, in accordance with some example, embodiments, a list of accepted or rejected QoS profile(s). At 350, the AMF 154 may forward to the SMF 156 the N2 SM information including a list of accepted or rejected QoS profile(s). The AMF may forward this information in an Nsmf_PDUSession_UpdateSMContext request message. At 360, the PDU session may be established.

In some example embodiments, there may be provided information elements for QoS rules to specify the set of authorized parameters used by the UE for classification and marking of uplink user traffic. In some example embodiments, the QoS rules may include at least one packet filter for the uplink direction. The packet filter(s) may determine traffic mapping to QoS flows. In some example embodiments, the QoS rules information element may be a type 6 information element having a minimum length of 4 octets and a maximum length of 65,538 octets.

FIGS. 3B-3E depict examples of information elements associated with QoS rules, in accordance with some example embodiments.

Figure 3B:
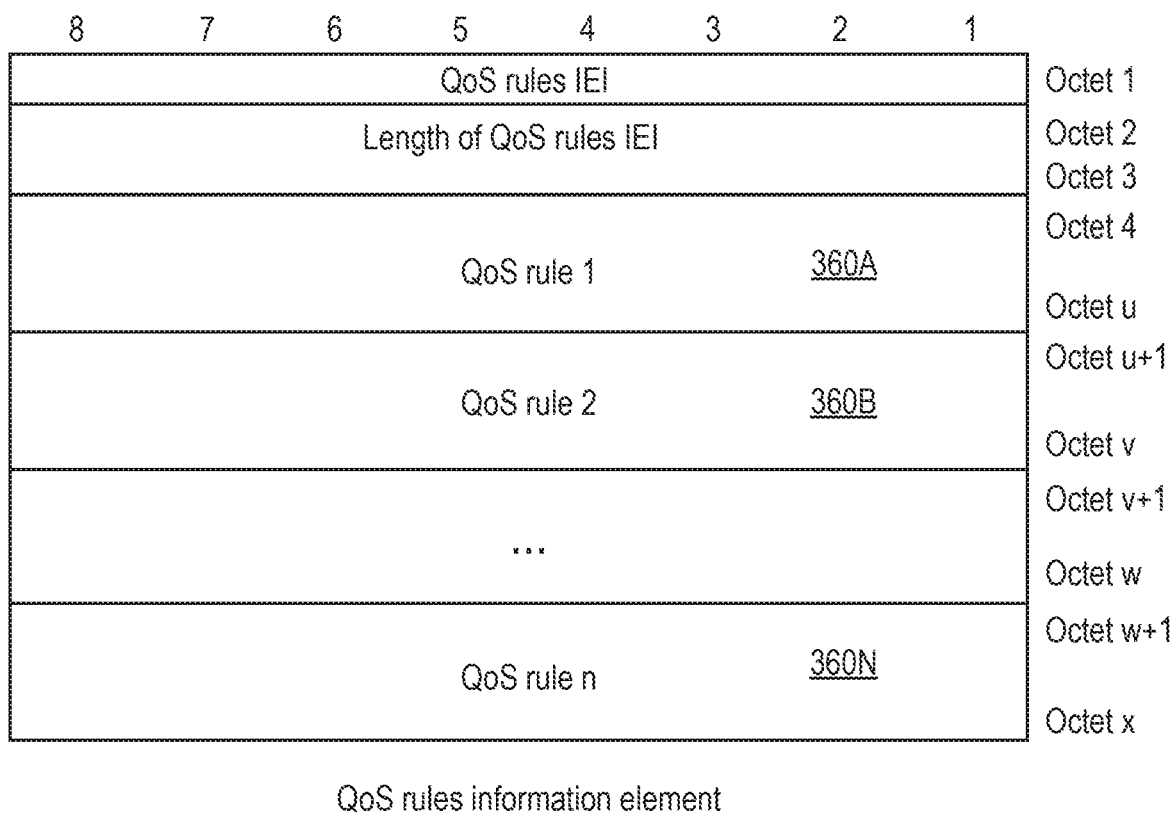

Referring to FIG. 3B, the QoS rules information element may be carried in messages, such as messages 320, 325, and 332 of FIG. 3A. The QoS rules may include at the 1$^{st}$ octet a QoS rules IEI, at the 2$^{nd}$ and 3$^{rd}$ octets an indication of the length in octets of the QoS rules information element, and at the 4th octet through x$^{th}$ octet may include QoS rules 1 through n 360A-360N.

Figure 3C:
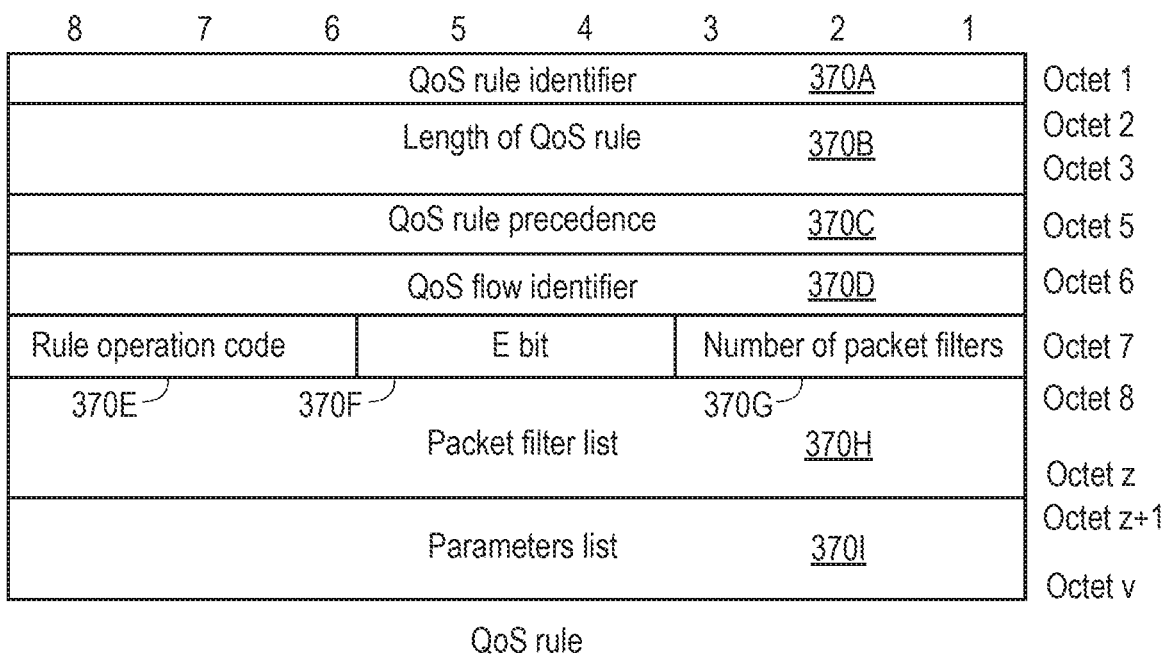

FIG. 3C depicts a given QoS rule 360A, in accordance with some example embodiments, The QoS rule 360A may include a QoS rule identifier 370A (octet 4) to identify the QoS rule. Alternatively or additionally, the QoS rule 360A may include (octets 5-6) a length 370B value to indicate the length in octets of the QoS rule 360A. Alternatively or additionally, the QoS rule 360A may include a QoS rule precedence 370C (octet 7). The QoS rule precedence field may be used to specify the precedence of the QoS rule among other QoS rules associated with the QoS flow associated with the QoS rule 360A. For example, the higher the value of the QoS rule precedence field, the lower the precedence of that QoS rule. Alternatively or additionally, the QoS rule 360A may include a QoS flow identifier 370D (octet 8). The QoS flow identifier field may be used to identify the QoS flow.

Alternatively or additionally, the QoS rule 360A may include a rule operation code 370E (octet 9), which may be at bits 6-8. Table 6 below depicts examples of rule operation codes.

Referring to Table 6, if the rule operation code is set to "Ignore this IE" and the E bit 370F and the number of packet filters to zero, then the network may ignore the contents of the QoS rule flow template information element.

TABLE 6

| Bits 8 7 6 | Rule Operations Code |
|---|---|
| 0 0 0 | Ignore this IE |
| 0 0 1 | Create new QoS rule |
| 0 1 0 | Delete existing QoS rule |
| 0 1 1 | Add packet filters to existing QoS rule |
| 1 0 0 | Replace packet filters in existing QoS rule |
| 1 0 1 | Delete packet filters from existing QoS rule |
| 1 1 0 | No packet filter operation |
| 1 1 1 | Reserved |

Referring again to FIG. 3C, the QoS rule 360A may include an E bit 370F (bit 5 of octet 9). The E bit may indicate if a parameters list is included in the QoS rule information element. The E bit may be encoded so that a value of 0 means the parameters list is not included, while a value of 1 means a parameters list is included.

Alternatively or additionally, the QoS rule 360A may include a Number of packet filters 370G (octet 9). The number of packet filters contains the binary coding for the number of packet filters in the packet filter list. The number of packet filters field may be encoded in bits 4 through 1 of octet 9, wherein bit 4 is the most significant and bit 1 is the least significant bit. For the "delete existing QoS rule" operation and for the "no packet filter operation", the number of packet filters may be coded as 0. For all other operations, the number of packet filters may be greater than 0 and less than or equal to 15.

Alternatively or additionally, the QoS rule 360A may include the packet filter list 370H-I (octets 10 to z). The packet filter list may include a variable number of uplink packet filters. For the "delete existing QoS rule" operation and the "no packet filter operation," the packet filter list may be empty.

For the "delete packet filters from existing QoS rule" operation, the packet filter list may include a variable number of packet filter identifiers. This variable number may be derived from the coding of the number of packet filters 370G. For the "create new QoS rule" operation, the packet filter list may contain 0 or a variable number of packet filters. This variable number may be derived from the coding of the number of packet filters field 370G. For the "add packet filters to existing QoS rule" and "replace packet filters in existing QoS rule" operations, the packet filter list may contain a variable number of packet filters. This variable number may be derived from the coding of the number of packet filters field 370G.

FIG. 3D depicts a packet filter list 370H, when the rule operation is delete packets from existing QoS rules in accordance with some example embodiments. FIG. 3E depicts a packet filter list 370H in accordance with some example embodiments, when the rule operation is create a new QoS rule, add packet filter to an existing QoS rule, and/or replace a packet filter in an existing QoS rules. Each packet filter may be of a variable length, and each packet filter may include a packet filter identifier (4 bits); a packet filter evaluation precedence (1 octet); the length of the packet filter contents (1 octet); and/or the packet filter contents itself (v octets).

The packet filter identifier field may be used to identify each packet filter in a QoS rule. The least significant 4 bits can be used. The packet filter evaluation precedence field may be used to specify the precedence for the packet filter among all packet filters in the QoS rule. Higher the value of the packet filter evaluation precedence field, lower the precedence of that packet filter is. The first bit in transmission order may the most significant bit. The length of the packet filter contents field may include the binary coded representation of the length of the packet filter contents field of a packet filter. The first bit in transmission order may be the most significant bit. The packet filter contents field may be of variable size and contains a variable number (at least one) of packet filter components. Each packet filter component may be encoded as a sequence of a one octet packet filter component type identifier and a fixed length packet filter component value field. The packet filter component type identifier may be transmitted first. In each packet filter, there may be not more than one occurrence of each packet filter component type. Among the "IPv4 remote address type" and "IPv6 remote address type" packet filter components, only one may be present in one packet filter. Among the "single local port type" and "local port range type" packet filter components, only one may be present in one packet filter. Among the "single remote port type" and "remote port range type" packet filter components, only one may be present in one packet filter. In the context of the packet filters, the term local refers to the UE and the term remote refers to an external network entity.

Referring to FIG. 3E, the packet filter identifier 389A-C field may be used to identify each packet filter in a QoS rule. The least significant 4 bits may be used as shown as shown in FIG. 3E to carry the packet filter identifier 389A-C. The packet filter evaluation precedence 390A-C field may be used to specify the precedence for the packet filter among all packet filters in the QoS rule. For example, the higher the value of the packet filter evaluation precedence field, the lower the precedence of that packet filter. The first bit in transmission order may be the most significant bit. The length of the packet filter contents 392A-C field may include the binary coded representation of the length of the packet filter contents field of a packet filter. The first bit in transmission order may be the most significant bit. The packet filter contents 394A-C field may be of variable size and may include at least one packet filter component. Each packet filter component may be encoded as a sequence of a one octet packet filter component type identifier and a fixed length packet filter component value field. The packet filter component type identifier may be transmitted first. In each packet filter, there may not be more than one occurrence of each packet filter component type. Among the "IPv4 remote address type" and "IPv6 remote address type" packet filter components, only one may be present in a single packet filter. Among the "single local port type" and "local port range type" packet filter components, only one may be present in single packet filter. Among the "single remote port type" and "remote port range type" packet filter components, only one may be present in a single packet filter (wherein local refers to the UE and the remote refers to an external network entity).

Table 7 lists example of packet filter component type identifiers, in accordance with some example embodiments. The packet filter contents (see, e.g., 394A, 394B OR 394C) field is of variable size and contains at least one packet filter component. Each packet filter component may be encoded as a sequence of a one octet packet filter component type identifier and a fixed length packet filter component value field. The packet filter component type identifier may be transmitted first.

TABLE 7

| Bits<br>8 7 6 5 4 3 2 1 | Packet Filter Component Types |
|---|---|
| 0 0 0 1 0 0 0 0 | IPv4 remote address type |
| 0 0 0 1 0 0 0 1 | IPv4 local address type |
| 0 0 1 0 0 0 0 0 | IPv6 remote address type |
| 0 0 1 0 0 0 0 1 | IPv6 remote address/prefix length type |
| 0 0 1 0 0 0 1 1 | IPv6 local address/prefix length type |
| 0 0 1 1 0 0 0 0 | Protocol identifier/Next header type |
| 0 1 0 0 0 0 0 0 | Single local port type |
| 0 1 0 0 0 0 0 1 | Local port range type |
| 0 1 0 1 0 0 0 0 | Single remote port type |
| 0 1 0 1 0 0 0 1 | Remote port range type |
| 0 1 1 0 0 0 0 0 | Security parameter index type |
| 0 1 1 1 0 0 0 0 | Type of service/Traffic class type |
| 1 0 0 0 0 0 0 0 | Flow label type |
| 1 0 0 0 0 0 0 1 | Destination MAC address type |
| 1 0 0 0 0 0 1 0 | Source MAC address type |
| 1 0 0 0 0 0 1 1 | 802.1Q C-TAG VID type |
| 1 0 0 0 0 1 0 0 | 802.1Q S-TAG VID type |
| 1 0 0 0 0 1 0 1 | 802.1Q C-TAG PCP/DEI type |
| 1 0 0 0 0 1 1 0 | 802.1Q S-TAG PCP/DEI type |
| 1 0 0 0 0 1 1 1 | Ethertype type |

All other values are reserved.

Referring to Table 7, for "IPv4 remote address type", the packet filter component value field may be encoded as a sequence of a four octet IPv4 address field and a four octet IPv4 address mask field. The IPv4 address field may be transmitted first. For "IPv4 local address type", the packet filter component value field may be encoded as defined for "IPv4 remote address type". Both the UE and network indication for support of the Local address in QoS rule may be required to use this packet filter component. For "IPv6 remote address type", the packet filter component value field may be encoded as a sequence of a sixteen octet IPv6 address field and a sixteen octet IPv6 address mask field. The IPv6 address field may be transmitted first. For "IPv6 remote address/prefix length type", the packet filter component value field may be encoded as a sequence of a sixteen octet IPv6 address field and one octet prefix length field. The IPv6 address field may be transmitted first. This parameter may be used, instead of IPv6 remote address type, when both the UE and network indication for support of the Local address in QoS rule are present. For "IPv6 local address/prefix length type", the packet filter component value field may be encoded as defined for "IPv6 remote address/prefix length". Both the UE and network indication for support of the Local address in QoS rule may be required to use this packet filter component.

For "Protocol identifier/Next header type", the packet filter component value field may be encoded as one octet which specifies the IPv4 protocol identifier or IPv6 next header.

For "Single local port type" and "Single remote port type", the packet filter component value field may be encoded as two octets specifying a port number. For "Local port range type" and "Remote port range type", the packet filter component value field may be encoded as a sequence of a two octet port range low limit field and a two octet port range high limit field. The port range low limit field may be transmitted first.

For "Security parameter index", the packet filter component value field may be encoded as four octets, which specifies the IPSec security parameter index. For "Type of service/Traffic class type", the packet filter component value field may be encoded as a sequence of a one octet Type-of-Service/Traffic Class field and a one octet Type-of-Service/Traffic Class mask field. The Type-of-Service/Traffic Class field may be transmitted first. For "Flow label type", the packet filter component value field may be encoded as three octets specifying the IPv6 flow label. The bits 8 through 5 of the first octet may be spare, while the remaining 20 bits may contain the IPv6 flow label. For "Destination MAC address type" and "Source MAC address type", the packet filter component value field may be encoded as 6 octets which specify a MAC address.

For "802.1Q C-TAG VID type", the packet filter component value field may be encoded as two octets which specify the VID of the Customer-VLAN tag (C-TAG). The bits 8 through 5 of the first octet may be spare whereas the remaining 12 bits may contain the VID. For "802.1Q S-TAG VID type", the packet filter component value field may be encoded as two octets which specify the VID of the Service-VLAN tag (S-TAG). The bits 8 through 5 of the first octet may be spare whereas the remaining 12 bits may contain the VID. For "802.1Q C-TAG PCP/DEI type", the packet filter component value field may be encoded as one octet which specifies the 802.1Q C-TAG PCP and DEI. The bits 8 through 5 of the octet may be spare, the bits 4 through 2 contain the PCP and bit 1 contains the DEI. For "802.1Q S-TAG PCP/DEI type", the packet filter component value field may be encoded as one octet which specifies the 802.1Q S-TAG PCP. The bits 8 through 5 of the octet may be spare, the bits 4 through 2 contain the PCP and bit 1 contains the DEI. For "Ethertype type", the packet filter component value field may be encoded as two octets which specify an Ethertype.

FIG. 3F depicts an example of a parameters list (which may be located at octets z+1 to v), in accordance with some example embodiments. The parameter list is part of the QoS rule, and is used to carry or provide QoS parameters to the UE, so the QoS flows that matched the packet filters will receive QoS treatment indicated in the parameters, such as GFBR uplink equals uplink guaranteed flow bit rate, MFBR downlink equals downlink maximum flow bit rate, and/or the like. The parameters list may include a variable number of parameters that may be transferred. If the parameters list is included, the E bit is set to 1; otherwise, the E bit is set to 0. Each parameter included in the parameters list is of variable length. Moreover, each parameter of the parameter list may include a parameter identifier (1 octet); a length of the parameter contents (1 octet); and/or the parameter contents itself (v octets). The parameter identifier field may be used to identify each parameter included in the parameters list, and may include a coding, such as hexadecimal coding, of the parameter identifier. The 8th bit 8 of the parameter identifier field may be the most significant bit, while the 1$^{st}$ bit may include the least significant bit. Examples of parameter identifiers include 01H (5QI), 02H (GFBR Uplink), 03H (GFBR Downlink), 04H (MFBR Uplink), and 05H (MFBR Downlink).

If the parameters list includes a parameter identifier that is not supported by the receiving entity, the corresponding parameter may be discarded. The length of parameter contents field may include the binary coded representation of the length of the parameter contents field. The first bit in transmission order may be the most significant bit.

When the parameter identifier indicates 5QI, the parameter contents field may include the binary representation of 5G QoS identifier that is one octet in length. When the parameter identifier indicates GFBR Uplink, the parameter contents field may include the binary representation of guaranteed flow bit rate for uplink that is four octets in length. When the parameter identifier indicates GFBR Downlink, the parameter contents field may include the binary representation of guaranteed flow bit rate for downlink that is four octets in length. When the parameter identifier indicates MFBR Uplink, the parameter contents field may include the binary representation of Maximum flow bit rate for uplink that is four octets in length. When the parameter identifier indicates MFBR Downlink, the parameter contents field may include the binary representation of Maximum flow bit rate for downlink that is four octets in length.

In some example embodiments, there may be provided a Session-AMBR information element to indicate the initial subscribed PDU session aggregate maximum bit rate when the UE establishes a PDU session or to indicate the new subscribed PDU session aggregate maximum bit rate if it is changed by the network. The Session-AMBR information element may be implemented as shown below in Table YY and XX. The Session-AMBR is a type 4 information element with a length of 8 octets.

TABLE YY

Session-AMBR information element

| 8 | 7 | 6 | 5 | 4 | 3 | 2 | 1 | |
|---|---|---|---|---|---|---|---|---|
| Session-AMBR IEI | | | | | | | | octet 1 |
| Length of Session-AMBR contents | | | | | | | | octet 2 |
| Unit for Session-AMBR for downlink | | | | | | | | octet 3 |
| APN-AMBR for downlink | | | | | | | | octet 4-5 |
| Unit for Session-AMBR for uplink | | | | | | | | octet 6 |
| Session-AMBR for uplink | | | | | | | | octet 7-8 |

TABLE XX

Session-AMBR information element
Unit for Session-AMBR for downlink (octet 3)

| | |
|---|---|
| 0 0 0 0 0 0 0 0 | value is not used |
| 0 0 0 0 0 0 0 1 | value is incremented in multiples of 100 kbps |
| 0 0 0 0 0 0 1 0 | value is incremented in multiples of 1 Mbps |
| 0 0 0 0 0 0 1 1 | value is incremented in multiples of 4 Mbps |
| 0 0 0 0 0 1 0 0 | value is incremented in multiples of 16 Mbps |
| 0 0 0 0 0 1 0 1 | value is incremented in multiples of 64 Mbps |
| 0 0 0 0 0 1 1 0 | value is incremented in multiples of 256 Mbps |
| 0 0 0 0 0 1 1 1 | value is incremented in multiples of 1 Gbps |
| 0 0 0 0 1 0 0 0 | value is incremented in multiples of 4 Gbps |
| 0 0 0 0 1 0 0 1 | value is incremented in multiples of 16 Gbps |
| 0 0 0 0 1 0 1 0 | value is incremented in multiples of 64 Gbps |
| 0 0 0 0 1 0 1 1 | value is incremented in multiples of 256 Gbps |
| 0 0 0 0 1 1 0 0 | value is incremented in multiples of 1 Tbps |
| 0 0 0 0 1 1 0 1 | value is incremented in multiples of 4 Tbps |
| 0 0 0 0 1 1 1 0 | value is incremented in multiples of 16 Tbps |
| 0 0 0 0 1 1 1 1 | value is incremented in multiples of 64 Tbps |
| 0 0 0 1 0 0 0 0 | value is incremented in multiples of 256 Tbps |
| 0 0 0 1 0 0 0 1 | value is incremented in multiples of 1 Pbps |
| 0 0 0 1 0 0 1 0 | value is incremented in multiples of 4 Pbps |
| 0 0 0 1 0 0 1 1 | value is incremented in multiples of 16 Pbps |
| 0 0 0 1 0 1 0 0 | value is incremented in multiples of 64 Pbps |
| 0 0 0 1 0 1 0 1 | value is incremented in multiples of 256 Pbps |

Other values shall be interpreted as multiples of 256 Pbps in this version of the protocol.
Session-AMBR for downlink (octets 4 and 5)
Octets 4 and 5 represent the binary coded value of PDU session aggregated maximum bit rate for downlink in units defined by octet 3.
Unit for Session-AMBR for uplink (octet 6)
The coding is identical to the unit coding defined for Session-AMBR for downlink (octet 3)
Session-AMBR for uplink (octets 7 and 8)
Octets 7 and 8 represent the binary coded value of PDU session aggregated maximum bit rate for uplink in units defined by octet 6.

In some example embodiments, the PDU session establishment accept message may include QoS rules, Session-AMBR, and other QoS parameters authorized by the network Table GG depicts an example implementation of the PDU session establishment accept message, in accordance with some example embodiments.

TABLE GG

PDU session establishment accept message

| IEI | Information Element | Type/Reference | Presence | Format | Length |
|---|---|---|---|---|---|
| | PDU session ID | PDU session ID | M | V | ½ |
| xx | QoS rules | QoS rules 12.4.2.1 | M | LV-E | 2-65537 |
| xx | Session-AMBR | Session-AMBR 12.4.2.2 | M | LV | 7 |
| xx | <QoS parameter> | <QoS parameter> | . . . | . . . | . . . |

Figure 4:
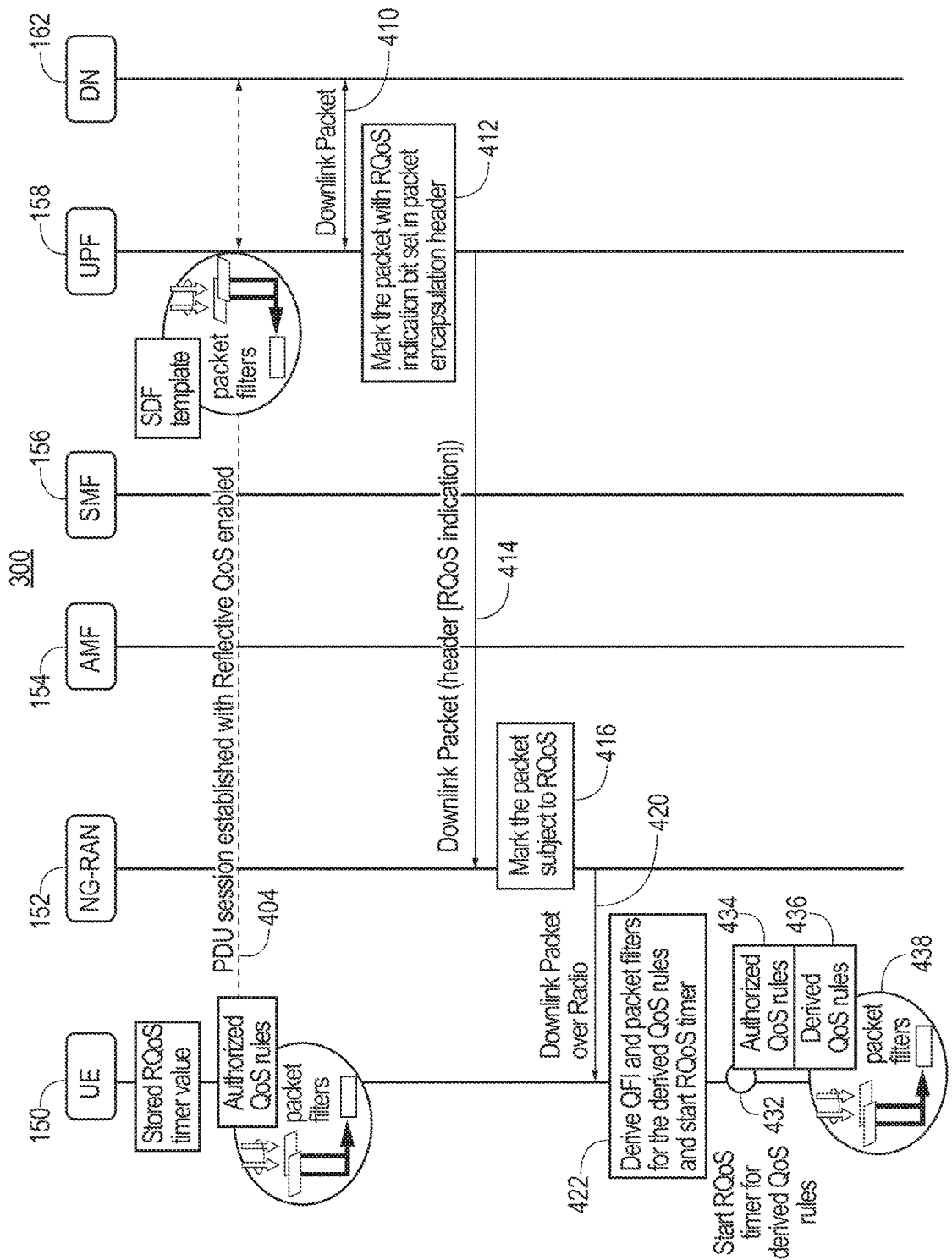
FIG. 4 depicts an example signaling flow 400 for obtaining derived QoS rules via reflective QoS, in accordance with some example embodiments.

FIG. 4 depicts an example signaling flow 400 for obtaining derived QoS rules via reflective QoS, in accordance with some example embodiments. The UE 150 may have stored, at 402, reflective QoS timer values, which it received from the network. Moreover, the UE may have authorized QoS rules including packet filters.

At 404, the PDU session may be established with reflective QoS enabled, in accordance with some example embodiments. When the UPF 158 receives at 410 downlink packet(s) from the data network (DN) 162 for the corresponding PDU session, the UPF 158 may mark, at 412, the packet(s) with RQoS indication bit set in packet encapsulation header, in accordance with some example embodiments. The UPF may forward, at 414, the marked downlink packets to the access network 150, in accordance with some example embodiments. The access network 150 may mark, at 416 that the downlink packets are subject to Reflective QoS. Upon receiving the downlink packet at 420, the UE 150 may, at 422, derive a quality flow indicator (QFI) and packet filters for the derived QoS rules as well as start the RQoS timer. The derived QoS rules may be used for uplink traffic to the network. The derived rules may include the QFI and the uplink packet filter, which is derived from the downlink packet header by using source IP information (for example, IP address, port, and/or the like). As long as RQoS timer is running and marking for the identified QoS flow is present, derived QoS rules can be used for uplink traffic QoS classification. Derived rules may include QFI and at least one uplink packet filter derived from the downlink packet header by using source IP information (IP address, port, etc.) as well as a default rule precedence value.

Figure 5:
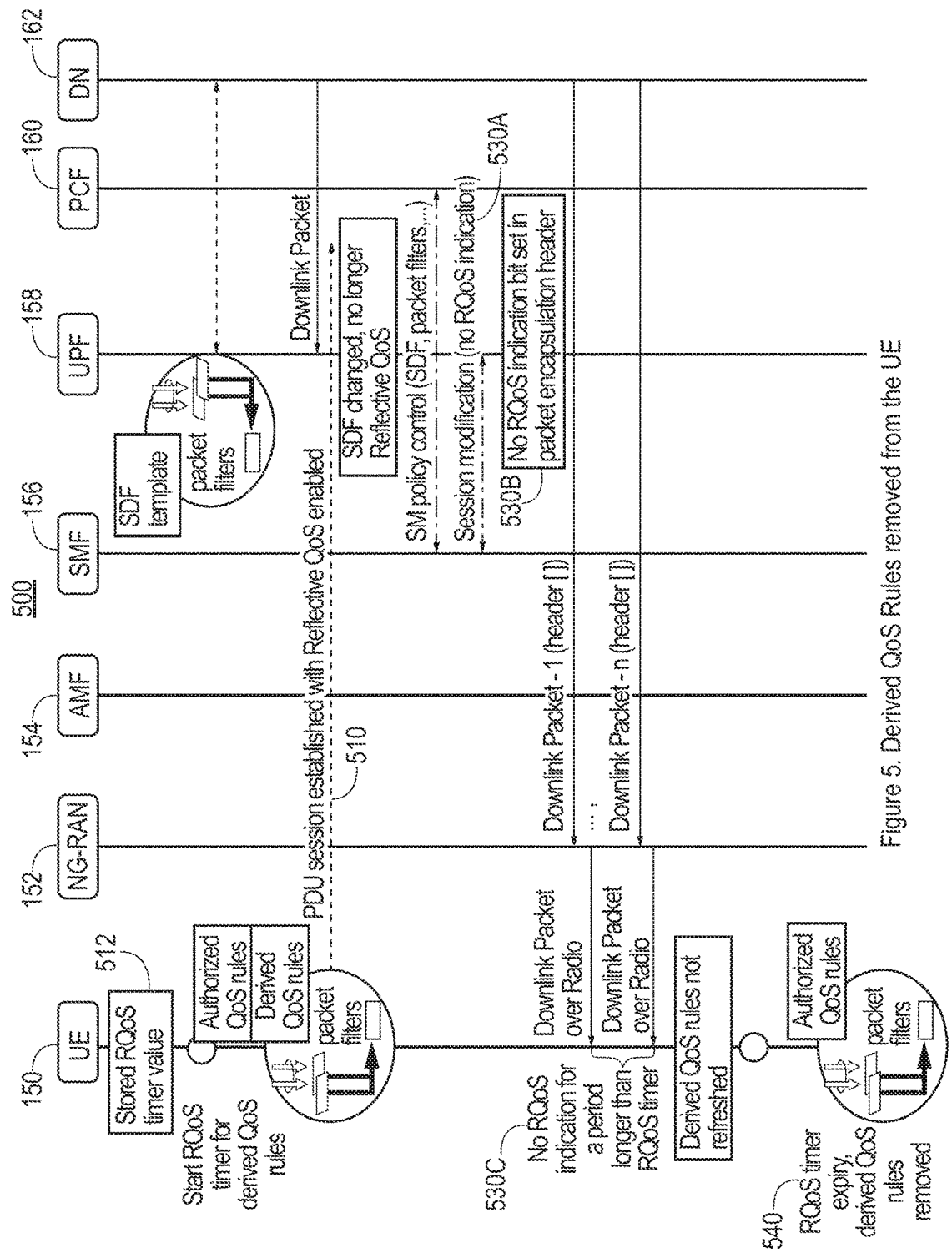
FIG. 5 depicts an example signaling flow for removal of derived QoS rules, in accordance with some example embodiments.

FIG. 5 depicts an example signaling flow 500 for derived QoS rules removed from the UE, in accordance with some example embodiments. The UE 150 may have stored, at 502, reflective QoS timer values, which it received from the network. Moreover, the UE may have authorized QoS rules including packet filters.

At 510, the PDU session may be established with the reflective QoS enabled, in accordance with some example embodiments. At 512, the derived QoS rules may be used for uplink traffic and the RQoS timer may be started. In the example of FIG. 5, the SDF has changed as there is no longer reflective QoS operations as indicated at 530A-C by the lack of an RQoS indication from the network. As shown, the UPF 158 did not set, at 530A, an RQoS indication bit in packet encapsulation header. If there is no RQoS indication in downlink packet for a period timer that is longer than RQoS timer 530C, the Reflective QoS timer may then expire, in which case the UE 150 derived QoS rules are removed, 540, from the UE.

Figure 6:
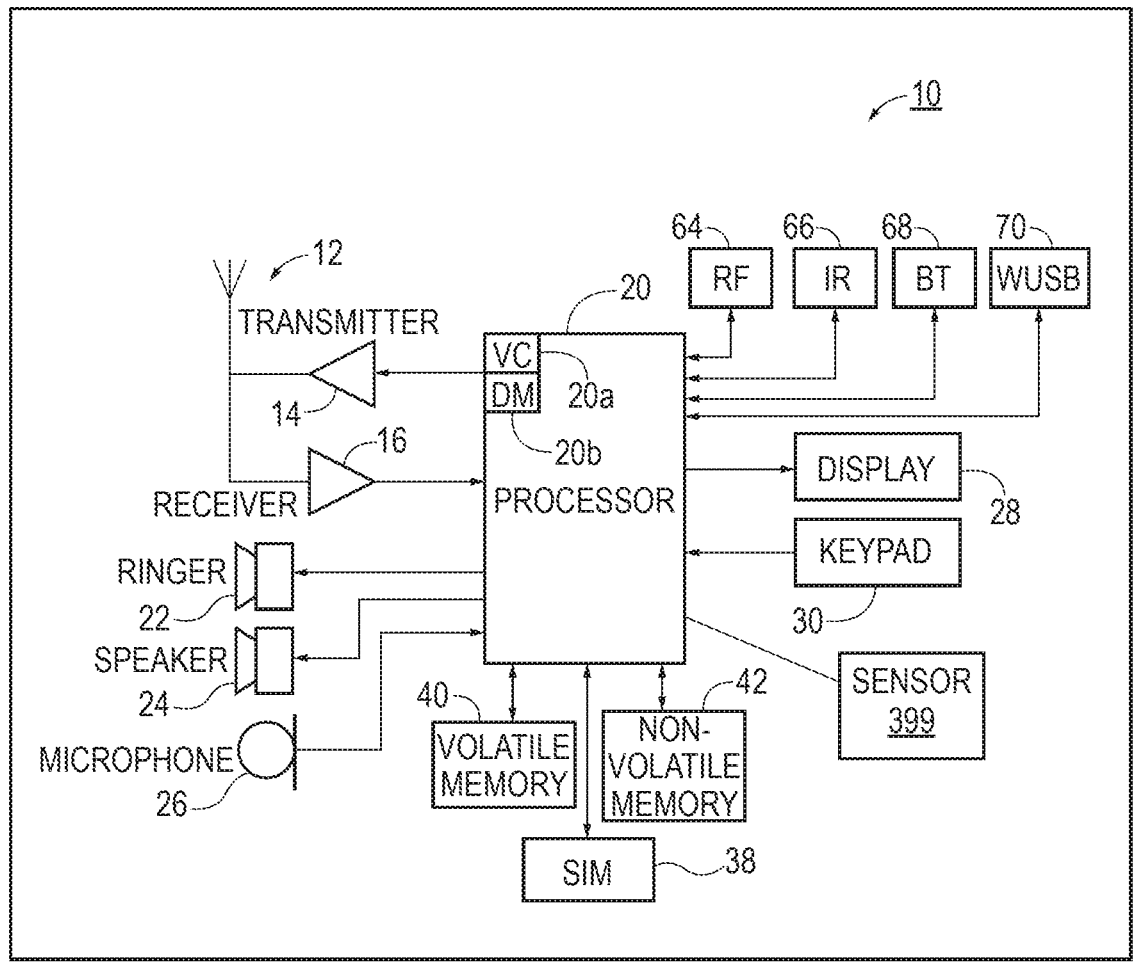
FIG. 6 depicts an example of an apparatus, in accordance with some example embodiments.

FIG. 6 illustrates a block diagram of an apparatus 10, in accordance with some example embodiments.

The apparatus 10 may represent a user equipment, such as the user equipment 150. Alternatively or additionally, portions of the apparatus 10 may provide a network node such as a base station, AMF, SMF, and/or the like. For example, the AMF and SMF may include a wired and/or wireless interface to other network nodes, at least one processor circuitry which may access program code to cause one or more operations discloses herein with respect to the AMF or SMF.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the processor 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including forming, by a user equipment, a session establishment message including an indication of at least one session management capability supported by the user equipment; sending, by the user equipment, the session establishment message including the indication towards a session management function; and receiving, by the user equipment and from the session management function, a response indicative of whether the session management function and/or a corresponding network supports the at least one session management capability to enable the user equipment to operate in accordance with the at least one session management capability. Alternatively or additionally, the apparatus may be configured to cause receiving, at a session management function node and from a user equipment, the session establishment message including an indication of at least one session management capability supported by the user equipment; and sending, by the session management function node and to the user equipment, a response indicative of whether the session management function and/or a corresponding network supports the at least one session management capability to enable the user equipment.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein including forming, by a user equipment, a session establishment message including an indication of at least one session management capability supported by the user equipment; sending, by the user equipment, the session establishment message including the indication towards a session management function; and receiving, by the user equipment and from the session management function, a response indicative of whether the session management function and/or a corresponding network supports the at least one session management capability to enable the user equipment to operate in accordance with the at least one session management capability. Alternatively or additionally, the apparatus may be configured to cause receiving, at a session management function node and from a user equipment, the session establishment message including an indication of at least one session management capability supported by the user equipment; and sending, by the session management function node and to the user equipment, a response indicative of whether the session management function and/or a corresponding network supports the at least one session management capability to enable the user equipment.

Some of the embodiments disclosed herein may be implemented in software, hardware, application logic, or a combination of software, hardware, and application logic. The software, application logic, and/or hardware may reside on memory 40, processor 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 6, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced session management.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   forming, by a user equipment, a session establishment message including an indication of at least one session management capability supported by the user equipment, the session management capability being reflective quality of service;
   sending, by the user equipment, the session establishment message including the indication towards a session management function; and
   receiving, by the user equipment and from the session management function, a response indicative of whether the session management function and/or a corresponding network supports the at least one session management capability to enable the user equipment to operate in accordance with the at least one session management capability, wherein the response includes at least one quality of service rule authorized for the user equipment and a timer value for a timer associated with the reflective quality of service, the timer value being indicative of whether the session management function supports the reflective quality of service.

2. The method of claim 1, wherein the session establishment message comprises a packet data unit session establishment request, wherein the session establishment message includes the indication, a packet data unit session identifier, and a packet data unit type.

3. The method of claim 1, wherein the indication comprises an information element comprising at least one bit, wherein a value of the at least one bit indicates whether the at least one session management capability is supported by the user equipment.

4. The method of claim 1, wherein the value of the at least one bit indicates whether the reflective quality of service is supported by the user equipment.

5. The method of claim 4, wherein the at least one quality of service rule authorized for the user equipment comprises at least one uplink packet filter.

6. The method of claim 5 further comprising:
receiving, by the user equipment, at least one downlink packet marked to indicate that the at least one packet is subject to the reflective quality of service; and
deriving, by the user equipment and based on the at least one downlink packet, at least one quality of service rule for use on at least one uplink packet.

7. The method of claim 5 further comprising:
receiving, by the user equipment, at least one downlink packet not marked to indicate that the at least one packet is subject to the reflective quality of service; and
removing, by the user equipment, at least one quality of service rule, when the timer expires.

8. The method of claim 1, wherein the response includes a packet data unit session establishment accept.

9. The method of claim 1, wherein the response includes session management information.

10. The method of claim 9, wherein the session management information and/or the at least one quality of service rule are carried by at least one information element.

11. An apparatus comprising:
at least one processor; and
at least one memory including computer program code, the at least one memory and the computer program code configured to, with the at least one processor, cause the apparatus to at least:
form a session establishment message including an indication of at least one session management capability supported by the apparatus, the session management capability being reflective quality of service;
send the session establishment message including the indication towards a session management function; and
receive, from the session management function, a response indicative of whether the session management function and/or a corresponding network supports the at least one session management capability to enable the apparatus to operate in accordance with the at least one session management capability, wherein the response includes at least one quality of service rule authorized for the apparatus and a timer value for a timer associated with the reflective quality of service, the timer value being indicative of whether the session management function supports the reflective quality of service.

12. The apparatus of claim 11, wherein the session establishment message comprises a packet data unit session establishment request, wherein the session establishment message includes the indication, a packet data unit session identifier, and a packet data unit type.

13. The apparatus of claim 11, wherein the indication comprises an information element comprising at least one bit, wherein a value of the at least one bit indicates whether the at least one session management capability is supported by the apparatus.

14. The apparatus of claim 11, wherein the value of the at least one bit indicates whether the reflective quality of service is supported by the apparatus.

15. The apparatus of claim 11, wherein the at least one quality of service rule authorized for the apparatus comprises at least one uplink packet filter.

16. The apparatus of claim 11, wherein the apparatus is further caused to at least receive one downlink packet marked to indicate that the at least one packet is subject to the reflective quality of service; and derive, based on the at least one downlink packet, at least one quality of service rule for use on at least one uplink packet.

17. The apparatus of claim 11, wherein the apparatus is further caused to at least receive at least one downlink packet not marked to indicate that the at least one packet is subject to the reflective quality of service; and remove at least one quality of service rule, when the timer expires.

18. The apparatus of claim 11, wherein the response includes a packet data unit session establishment accept.

19. The apparatus of claim 11, wherein the response includes session management information.

20. The apparatus of claim 19, wherein the session management information and/or at least one quality of service rule are carried by at least one information element, wherein the apparatus comprises a user equipment.

21. A non-transitory computer-readable medium including program code which when executed causes operations comprising:
forming, by a user equipment, a session establishment message including an indication of at least one session management capability supported by the user equipment, the session management capability being reflective quality of service;
sending, by the user equipment, a session establishment message including the indication towards a session management function; and
receiving, by the user equipment and from the session management function, a response indicative of whether the session management function and/or a corresponding network supports the at least one session management capability to enable the user equipment to operate in accordance with the at least one session management capability, wherein the response includes at least one quality of service rule authorized for the user equipment at a timer value for a timer associated with the reflective quality of service, the timer value being indicative of whether the session management function supports the reflective quality of service.

22. A method comprising:
receiving, at a session management function node and from a user equipment, a session establishment message including an indication of at least one session management capability supported by the user equipment, the session management capability being reflective quality of service; and
sending, by the session management function node and to the user equipment, a response indicative of whether the session management function and/or a corresponding network supports the at least one session management capability to enable the user equipment to operate in accordance with the at least one session management capability, wherein the response includes at least one quality of service rule authorized for the user equipment and a timer value for a timer associated with the reflective quality of service, the timer value being indicative of whether the session management function supports the reflective quality of service.

23. The method of claim 22, wherein the session establishment message comprises a packet data unit session establishment request, wherein the session establishment message includes the indication, a packet data unit session identifier, and a packet data unit type.

24. The method of claim 22, wherein the indication comprises an information element comprising at least one bit, wherein a value of the at least one bit indicates whether the at least one session management capability is supported by the user equipment.

25. The method of claim 22, wherein the value of the at least one bit indicates whether the reflective quality of service is supported by the user equipment.

26. The method of claim 22, wherein the response includes a packet data unit session establishment accept.

27. The method of claim 22, wherein the response includes session management information, at least one quality of service rule authorized for the apparatus, and/or at least one capability parameter.

28. An apparatus comprising:
at least one processor; and
at least one memory including computer program code, the at least one memory and the computer program code configured to, with the at least one processor, cause the apparatus to at least:
receive, at the apparatus and from a user equipment, a session establishment message including an indication of at least one session management capability supported by the user equipment, the session management capability being reflective quality of service; and
send, by the apparatus and to the user equipment, a response indicative of whether the session management function and/or a corresponding network supports the at least one session management capability to enable the user equipment to operate in accordance with the at least one session management capability, wherein the response includes at least one quality of service rule authorized for the user equipment and a timer value for a timer associated with the reflective quality of service, the timer value being indicative of whether the session management function supports the reflective quality of service.

29. The apparatus of claim 28, wherein the session establishment message comprises a packet data unit session establishment request, wherein the session establishment message includes the indication, a packet data unit identifier, and a packet data unit type.

30. The apparatus of claim 28, wherein the indication comprises an information element comprising at least one bit, wherein the value of the at least one bit indicates whether the at least one session management capability is supported by the user equipment.

31. The apparatus of claim 30, wherein the value of the at least one bit indicates whether the reflective quality of service is supported by the user equipment.

32. The apparatus of claim 28, wherein the response includes a packet data session establishment accept.

33. The apparatus of claim 28, wherein the response includes session management information and/or at least one capability parameter.

34. A non-transitory computer-readable medium including program code which when executed causes operations comprising:
receiving, at a session management function node and from a user equipment, a session establishment message including an indication of at least one session management capability supported by the user equipment, the session management capability being reflective quality of service; and
sending, by the session management function node and to the user equipment, a response indicative of whether the session management function and/or a corresponding network supports the at least one session management capability to enable the user equipment to operate in accordance with the at least one session management capability, wherein the response includes at least one quality of service rule authorized for the user equipment and a timer value for a timer associated with the reflective quality of service, the timer value being indicative of whether the session management function supports the reflective quality of service.

* * * * *